Aug. 28, 1923.

W. B. LASKEY

CANDY MAKING MACHINE

Filed Dec. 16, 1920

1,466,509

INVENTOR:
William B. Laskey
by Macleod, Calver, Copeland & Dike
Attys.

Patented Aug. 28, 1923.

1,466,509

UNITED STATES PATENT OFFICE.

WILLIAM B. LASKEY, OF MARBLEHEAD, MASSACHUSETTS.

CANDY-MAKING MACHINE.

Application filed December 16, 1920. Serial No. 431,254.

*To all whom it may concern:*

Be it known that I, WILLIAM B. LASKEY, a citizen of the United States, residing at Marblehead, county of Essex, State of Massachusetts, have invented a certain new and useful Improvement in Candy-Making Machines, of which the following is a specification, reference being had therein to the accompanying drawings.

My invention has for its object a machine for extruding plastic candy or like substances through a die to give it the form of the die. Such machines are used in the manufacture of candy of various kinds, as for instance, stick candy and filled centre goods. As is well known to those skilled in the art, these machines are built with two cylinders so that the time consumed while the candy is being extruded through the die of one cylinder may be employed in charging another cylinder, so that it will be ready to begin work as soon as the charge in the first cylinder has been completely extruded. I have built machines for this purpose heretofore with two oppositely disposed cylinders in which are pistons having a common piston rod, the cylinders being turned end for end with relation to the conveyor, cutter or other receiving device for the candy after the extrusion of the candy from each cylinder. Such machines are objectionable, because of the large amount of floor space occupied by them and for certain other reasons not necessary to be set forth herein.

My present invention, therefore, has for its object to provide a machine for the same purpose which shall be more compact and convenient to handle. The machine has certain other advantages which will be apparent hereafter.

The invention will be fully understood from the following description when taken in connection with the accompanying drawings, and the novel features thereof will be pointed out and clearly defined in the claims at the close of this specification.

Figure 1:
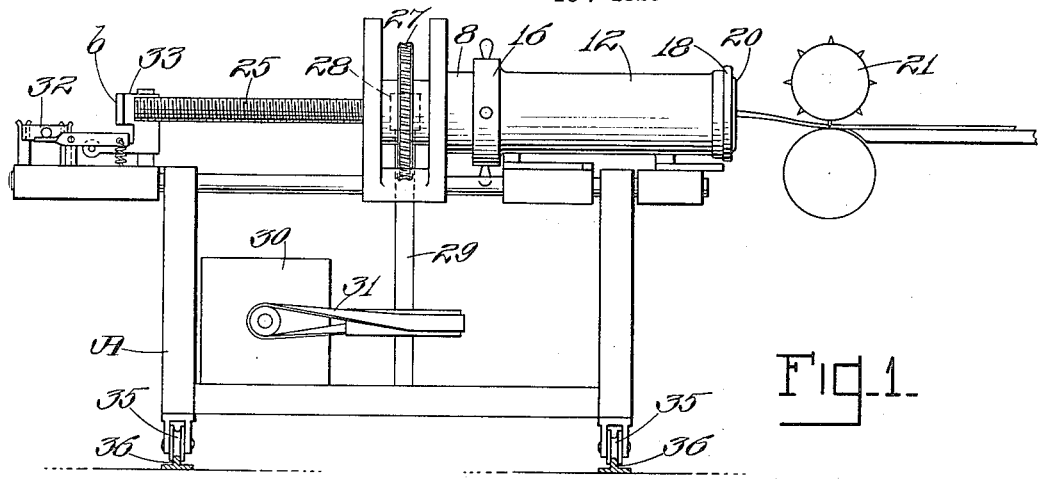

In the drawings, Fig. 1 is a side elevation of the machine embodying my invention.

Figure 2:
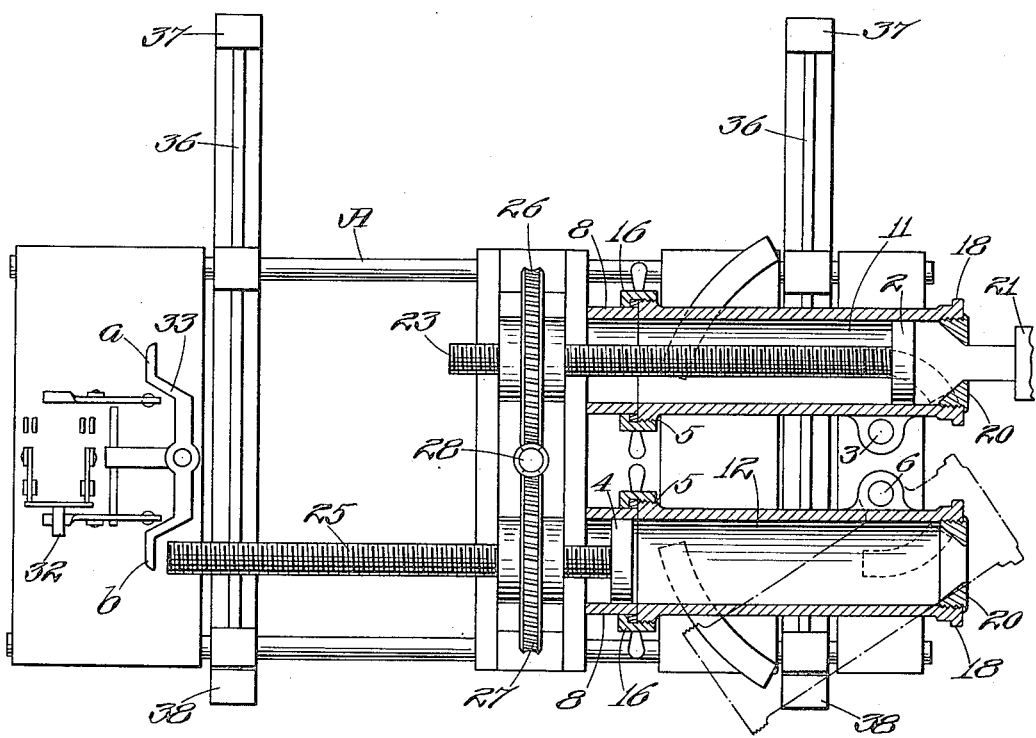

Fig. 2 is a top plan view partly in section of the machine shown in Figure 1.

Referring now to the drawings, at A is shown the frame of the machine, and at 11 and 12, two working cylinders. The cylinder 11 is pivoted at 3 to the frame A and the cylinder 12 is pivoted at 6, so that each cylinder can be swung out of alignment with its respective piston and can be charged conveniently with the hot pulled candy upon which it operates. At the ends of the cylinders are screw-threads shown at 5 for engagement with capstan nuts 16 by which the cylinders are secured in working position. The cylinder heads are shown at 8 and are secured to the frame A of the machine. Each cylinder is provided at its outer end 18 with a die 20.

I have indicated at 21 a receiving device which may be a chute, conveyor, pulling mechanism or cutter, or other device for operating on the candy or conveying it away. In the drawings, I have shown mechanism which pulls the candy away from the die for the purpose of reducing its size and improving the lustre.

The cylinder 11 is provided with a piston 2 mounted on a screw-thread piston rod 23, while the cylinder 12 is provided with a piston 4 having a similar screw-threaded piston rod 25. On the rod 23 is a gear nut 26 and on the piston rod 25 is a similar nut 27. These nuts are formed with suitable gear teeth on their exterior peripheries for engagement with a common operating member which, in the drawings, I have shown as a vertical worm 28 mounted on a shaft 29. This shaft is driven by a motor 30 and a belt 31 or other operating mechanism. At 32 is shown an electric switch for reversing the motor 30, this switch being operated by a pivoted latch 33 having two wings *a* and *b* which are in line with the ends of the piston rods 23 and 25 respectively.

From the foregoing, it will be seen that the direction of rotation of the motor will be reversed when one of the piston rods strikes against the corresponding portion of the latch 33 and, further, that since the piston rods 23 and 25 are each provided with screw threads of the same direction, one piston will be moved out from its cylinder while the other one is being moved into its cylinder.

The frame A of the machine is mounted on rollers 35 which run on tracks 36, back stops 37 and front stops 38 being provided to limit the movement of the machine on these tracks. These stops are so located that when the machine is against the back stops 37, the cylinder 12 will be in position to deliver its product to the receiving device 21, and the cylinder 11 will be at the delivery position when the frame is against the front stops 38.

In the drawings, I have shown the machine embodying my invention as movable in a horizontal plane on horizontal tracks. I do not, however, limit myself to this construction, as it will be obvious that the machine may depend from tracks and move in a vertical plane.

What I claim is—

1. In combination, a receiving device for the product, a pair of cylinders operating alternately with each other and arranged side by side and means to permit the said pair of cylinders to be shifted relatively to the said receiving device to present the working cylinder alternately to the receiving device.

2. In combination, a pair of cylinders arranged side by side, a frame on which said cylinders are mounted, a track, said frame being slidable on said track, pistons in said cylinders having rods which are screw-threaded, gear nuts on said threaded piston rods, a worm operating both of said gear nuts in such manner as to drive said pistons simultaneously in opposite directions to each other, an electrical motor having a switch for reversing the motor, and a pivoted member having arms in position to be engaged respectively by the said two piston rods at the end of their backward stroke in such manner that when one of said arms is engaged by one of said piston rods said switch will thereby be actuated to reverse the motor.

3. In a machine of the character described, in combination, a pair of cylinders arranged side by side, pistons in said cylinders, the rods thereof being screw-threaded, gear nuts on said threaded piston rods, and a worm located between said gear nuts and operating them in opposite directions.

4 In a machine of the character described, the combination of a pair of cylinders arranged side by side, pistons in said cylinders, means for moving said pistons simultaneously and alternately in opposite directions, said cylinders being pivoted to permit them to be swung to an angle with the axial line of the pistons.

5 In a machine of the character described, a pair of cylinders arranged side by side, a frame on which said cylinders are mounted, a track, a receiving device for the product, pistons in said cylinders and common operating mechanism to move said pistons simultaneously in opposite directions, said frame being slidable on said track to present the cylinders alternately to the receiving device.

6. In a machine of the character described, in combination, a receiving device for the product, a pair of cylinders, pistons in said cylinders, a frame on which said cylinders are mounted side by side, a track, said frame being slidable on said track to permit said cylinders to be shifted relatively to said receiving device to present the working cylinders alternately to the receiving device, a source of power on said frame, means operated from said source of power for moving said pistons simultaneously in opposite directions, and means operated by said pistons for reversing the direction of movement thereof.

7. In a machine of the character described, a pair of cylinders arranged side by side, a frame on which said cylinders are mounted, a track, a receiving device for the product, pistons in said cylinders, and common operating mechanism to move said pistons simultaneously in opposite directions, said frame being slidable on said track to permit said pair of cylinders to be shifted relatively to said receiving device to present the working cylinders alternately to the receiving device, and said cylinders being pivoted to said frame to permit the non-working cylinder to be swung to an angle with the axial line of its piston.

In testimony whereof I affix my signature.

WILLIAM B. LASKEY.